(12) United States Patent
Bledsoe

(10) Patent No.: US 12,121,160 B1
(45) Date of Patent: Oct. 22, 2024

(54) MAGNETIC SHELF SYSTEM

(71) Applicant: Dustin Bledsoe, Mount Airy, NC (US)

(72) Inventor: Dustin Bledsoe, Mount Airy, NC (US)

( * ) Notice: Subject to any disclaimer, the term of this patent is extended or adjusted under 35 U.S.C. 154(b) by 223 days.

(21) Appl. No.: 17/867,897

(22) Filed: Jul. 19, 2022

(51) Int. Cl.
*A47F 5/00* (2006.01)
*F16B 1/00* (2006.01)

(52) U.S. Cl.
CPC .............. *A47F 5/0068* (2013.01); *F16B 1/00* (2013.01); *F16B 2200/83* (2023.08)

(58) Field of Classification Search
CPC ........................... A47B 47/022; A47B 96/027
USPC ....... 108/42, 152; 211/126.5, 90.01
See application file for complete search history.

(56) References Cited

U.S. PATENT DOCUMENTS

| | | | | | |
|---|---|---|---|---|---|
| 2,144,835 | A | * | 1/1939 | Dickinson | A47F 3/08 310/12.21 |
| 2,615,583 | A | * | 10/1952 | Johnson | A47F 5/04 D11/118 |
| 2,736,131 | A | * | 2/1956 | Lewis, Jr. | A63H 3/50 5/503.1 |
| 3,204,776 | A | * | 9/1965 | Brown | B25H 3/04 248/222.41 |
| 4,365,720 | A | * | 12/1982 | Kaneshiro | B25H 3/006 211/73 |
| 5,413,228 | A | * | 5/1995 | Le Clerc | A63B 71/0045 D6/552 |
| 5,826,851 | A | * | 10/1998 | Arbisi | A47G 1/17 40/594 |
| 6,389,991 | B1 | * | 5/2002 | Morrisson | A47B 57/585 211/184 |
| 6,581,788 | B1 | * | 6/2003 | Winig | F16B 12/26 211/183 |
| 7,028,619 | B2 | * | 4/2006 | McLemore | A47F 5/0043 108/42 |
| 8,376,299 | B2 | * | 2/2013 | Burkman | A47G 1/16 248/248 |
| 8,474,781 | B2 | * | 7/2013 | Deguglimo | A47F 5/0068 340/568.1 |
| 8,573,415 | B2 | * | 11/2013 | Ernst | B25H 3/04 248/220.21 |
| 11,761,576 | B1 | * | 9/2023 | Bryner | A47B 23/044 108/9 |
| 11,871,858 | B1 | * | 1/2024 | Bledsoe | A47F 5/0068 |
| 2003/0038100 | A1 | * | 2/2003 | Liu | B25H 3/06 211/90.01 |
| 2003/0183132 | A1 | * | 10/2003 | Dowers | E04F 19/00 108/42 |

(Continued)

*Primary Examiner* — Jose V Chen
(74) *Attorney, Agent, or Firm* — Kyle A. Fletcher, Esq.

(57) ABSTRACT

The magnetic shelf system is a display. The magnetic shelf system is configured for use with one or more images. The magnetic shelf system is configured for use with one or more figurines. There is a one to one correspondence between the one or more images and the one or more figurines. Each individual image selected from the one or more images is associated with an individual figurine selected from the one or more figurines. The magnetic shelf display comprises a mounting shield, an image mount, and a figurine shelf. The image mount and the figurine shelf attach to the mounting shield. The image mount displays an individual image selected from the one or more images. The figurine shelf displays the individual figurine selected from the one or more figurines that is associated with the selected individual image.

11 Claims, 6 Drawing Sheets

(56) References Cited

U.S. PATENT DOCUMENTS

| | | | | |
|---|---|---|---|---|
| 2004/0211741 | A1* | 10/2004 | Bustos | A47F 5/0037 |
| | | | | 211/187 |
| 2005/0199566 | A1* | 9/2005 | Sudholt | A47F 7/0007 |
| | | | | 211/85.29 |
| 2006/0207480 | A1* | 9/2006 | Knight | A47B 37/00 |
| | | | | 108/50.01 |
| 2010/0193451 | A1* | 8/2010 | Levine | A47F 5/04 |
| | | | | 211/37 |
| 2012/0255923 | A1* | 10/2012 | Johnson | A47B 57/10 |
| | | | | 211/88.01 |
| 2015/0250308 | A1* | 9/2015 | Jacob | F16H 19/04 |
| | | | | 108/146 |
| 2023/0189981 | A1* | 6/2023 | McGraw | A47G 7/045 |
| | | | | 108/42 |

* cited by examiner

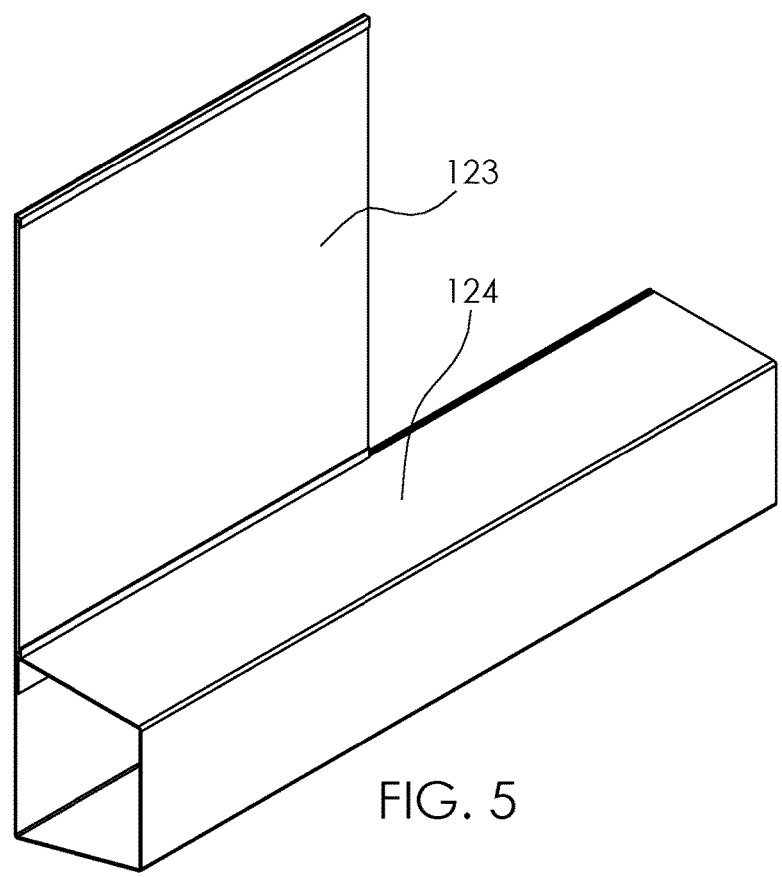
FIG. 5
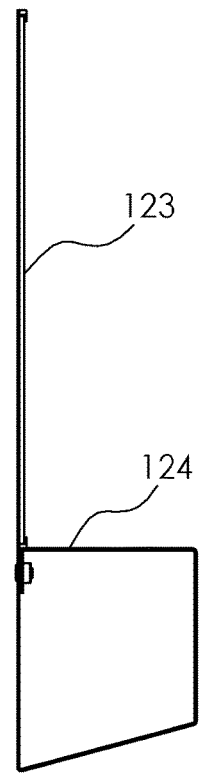
FIG. 6
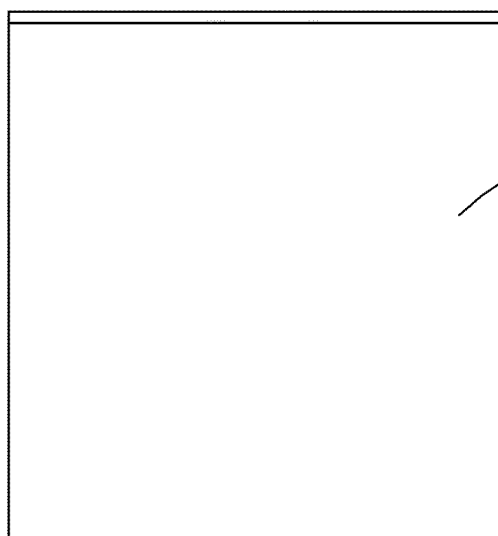
FIG. 7
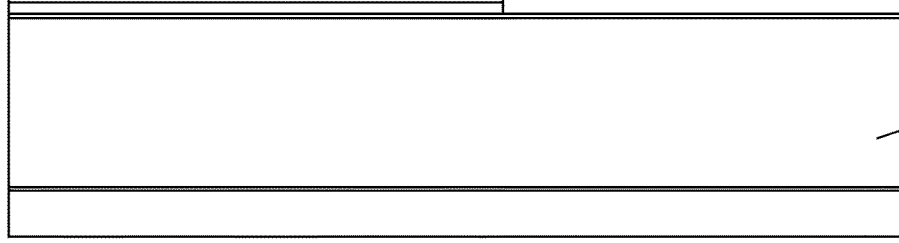

US 12,121,160 B1

MAGNETIC SHELF SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of display shelves characterized by their constructional features.

Summary of Invention

The magnetic shelf system is a display. The magnetic shelf system is configured for use with one or more images. The magnetic shelf system is configured for use with one or more figurines. There is a one to one correspondence between the one or more images and the one or more figurines. Each individual image selected from the one or more images is associated with an individual figurine selected from the one or more figurines. The magnetic shelf display comprises a mounting shield, an image mount, and a figurine shelf. The image mount and the figurine shelf attach to the mounting shield. The image mount displays an individual image selected from the one or more images. The figurine shelf displays the individual figurine selected from the one or more figurines that is associated with the selected individual image.

These together with additional objects, features and advantages of the magnetic shelf system will be readily apparent to those of ordinary skill in the art upon reading the following detailed description of the presently preferred, but nonetheless illustrative, embodiments when taken in conjunction with the accompanying drawings.

In this respect, before explaining the current embodiments of the magnetic shelf system in detail, it is to be understood that the magnetic shelf system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the magnetic shelf system.

It is therefore important that the claims be regarded as including such equivalent construction insofar as they do not depart from the spirit and scope of the magnetic shelf system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 5 is a perspective view of an embodiment of the disclosure.
FIG. 6 is a side view of an embodiment of the disclosure.
FIG. 7 is a front view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
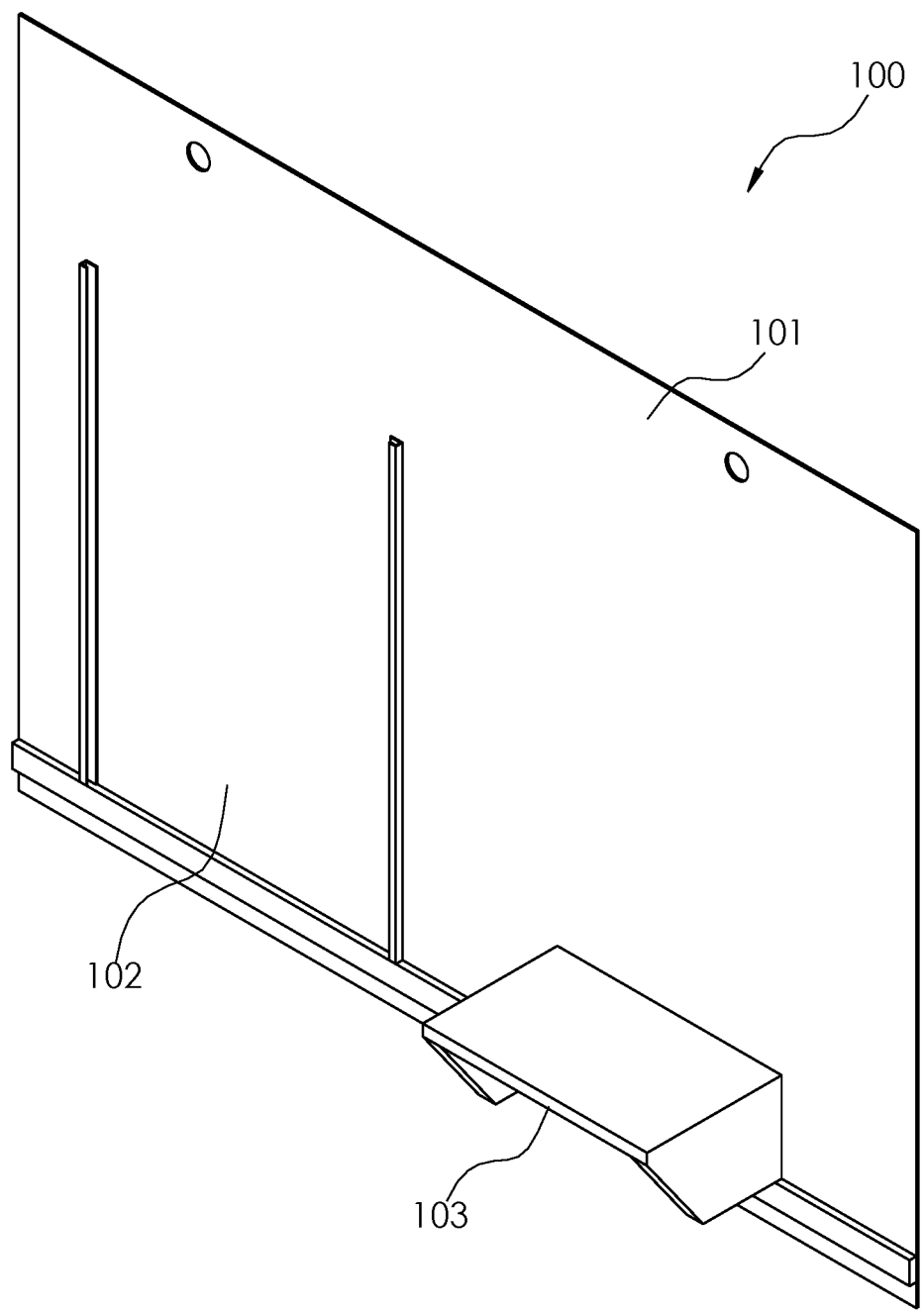
FIG. 1 is a perspective view of an embodiment of the disclosure.
Figure 2:
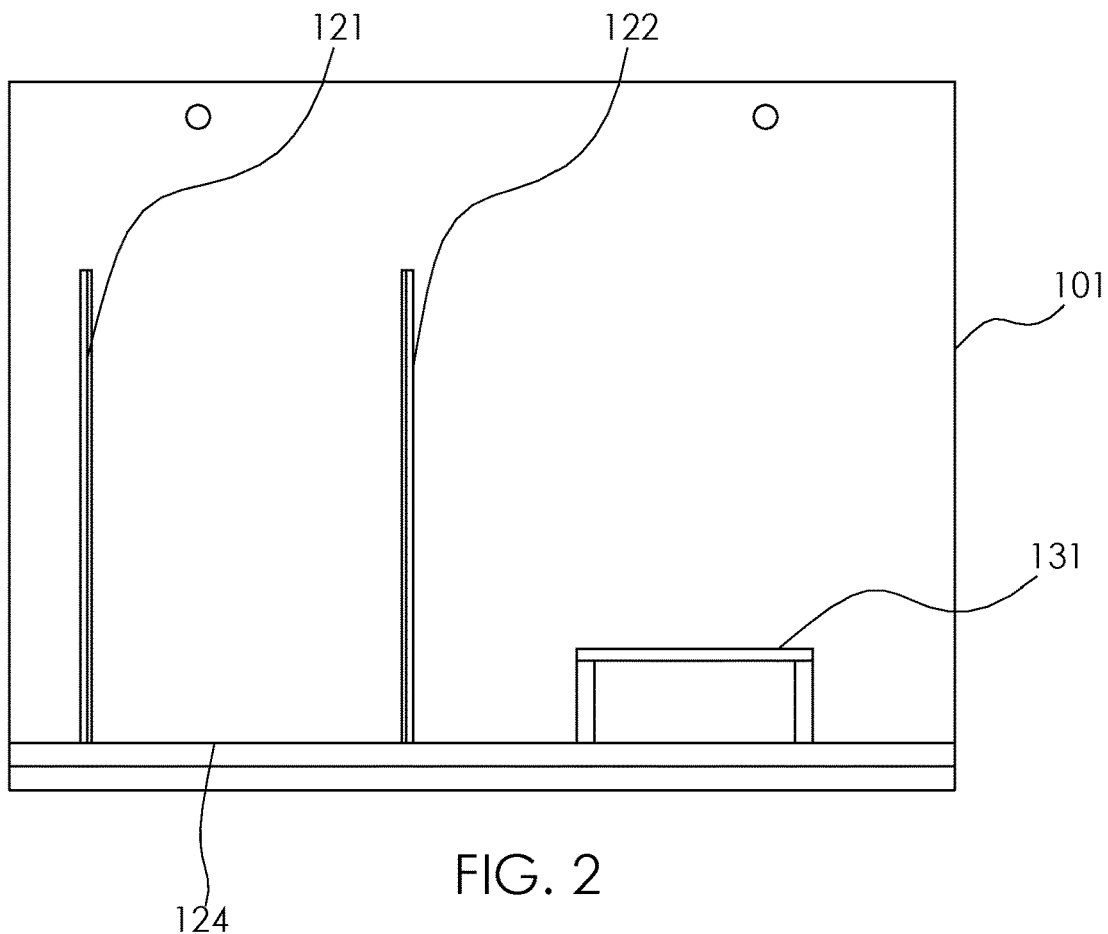
FIG. 2 is a front view of an embodiment of the disclosure.
Figure 3:
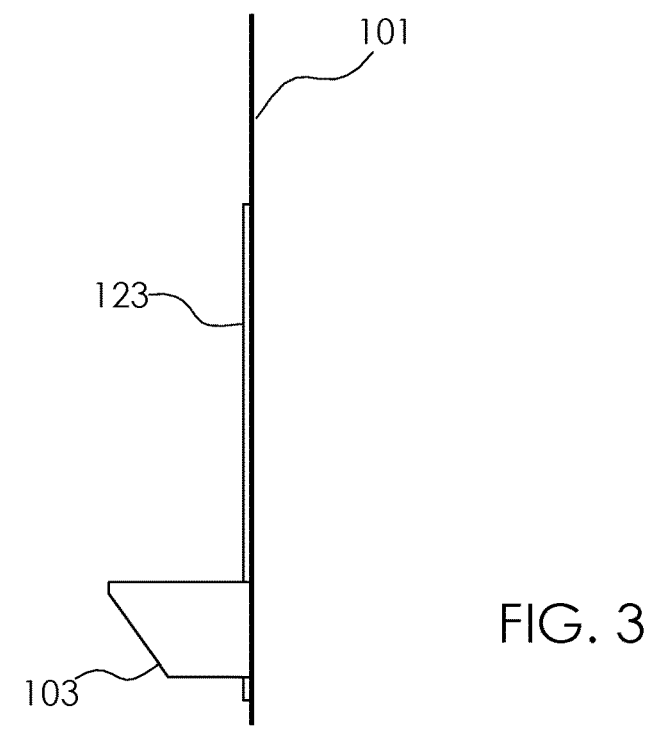
FIG. 3 is a side view of an embodiment of the disclosure.
Figure 4:
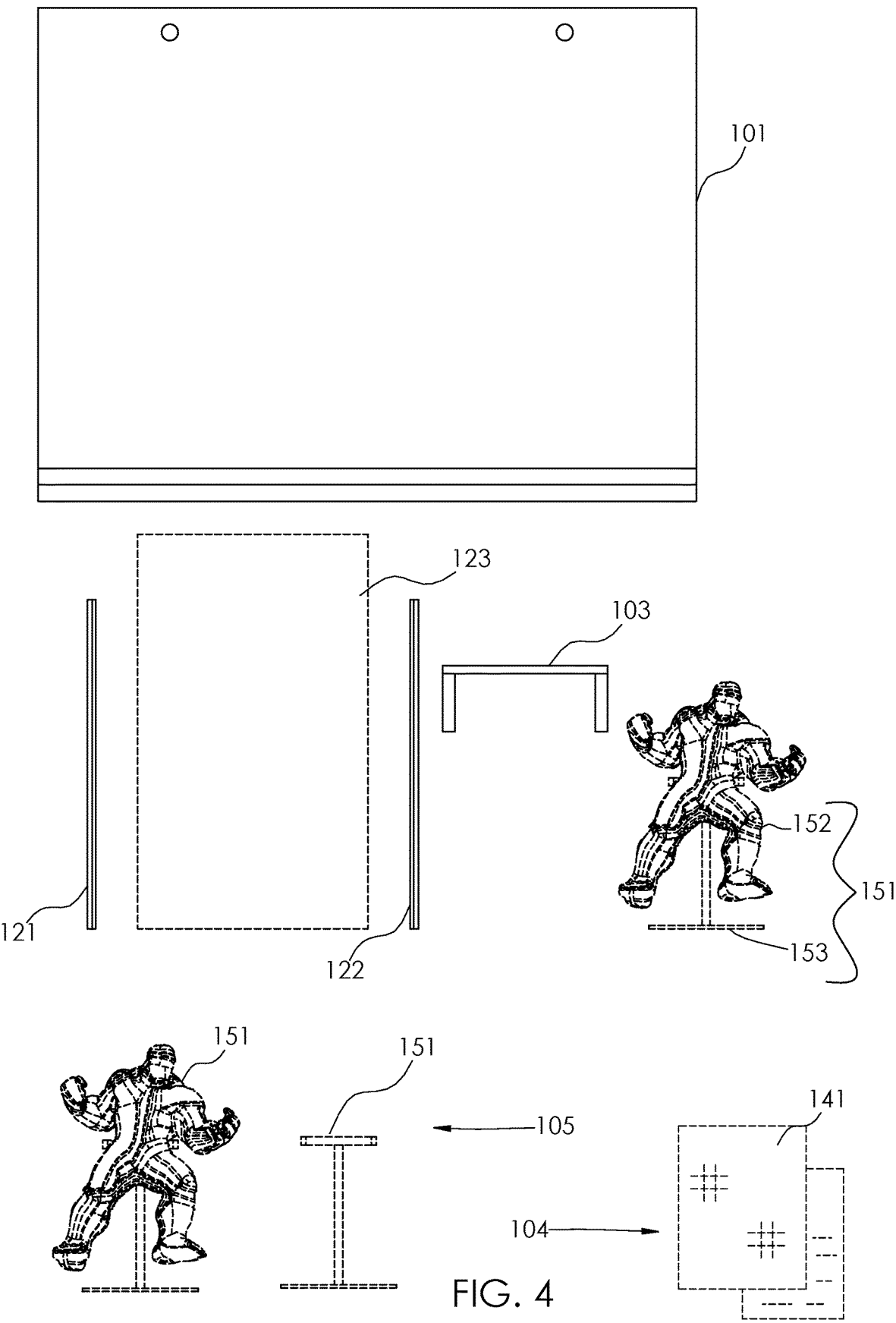
FIG. 4 is an exploded view of an embodiment of the disclosure.
Figure 8:
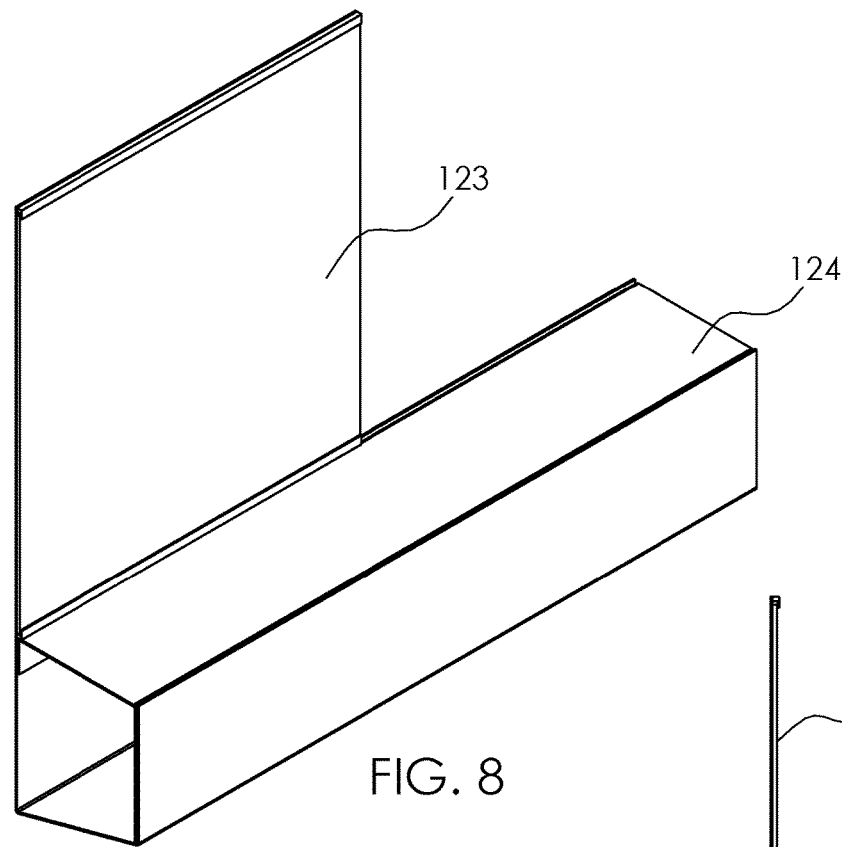
FIG. 8 is a perspective view of an embodiment of the disclosure.
Figure 9:
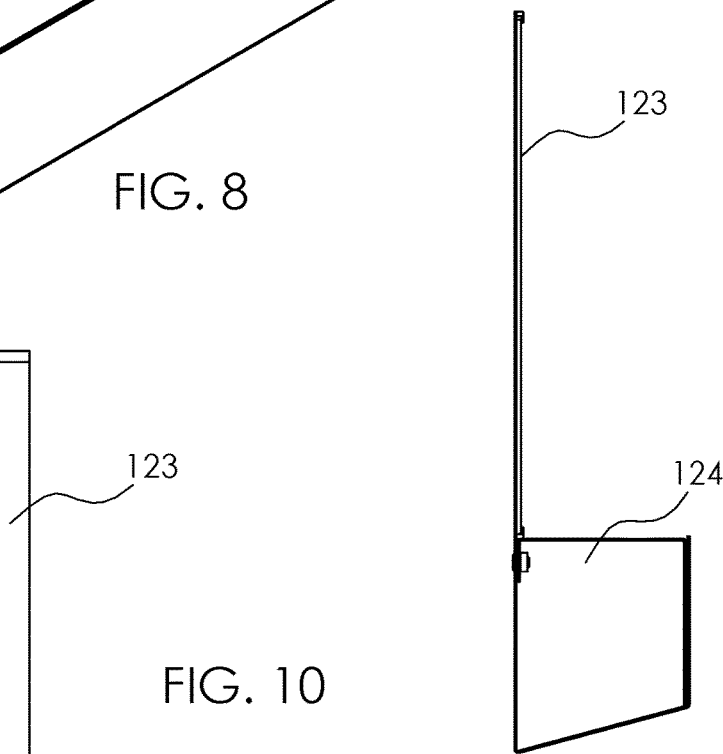
FIG. 9 is a side view of an embodiment of the disclosure.
Figure 10:
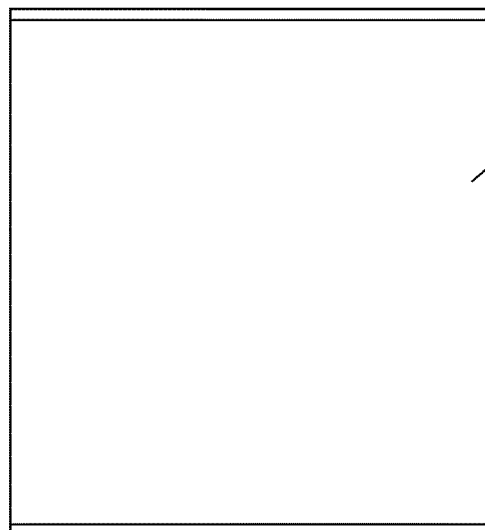
FIG. 10 is a front view of an embodiment of the disclosure.
Figure 10:
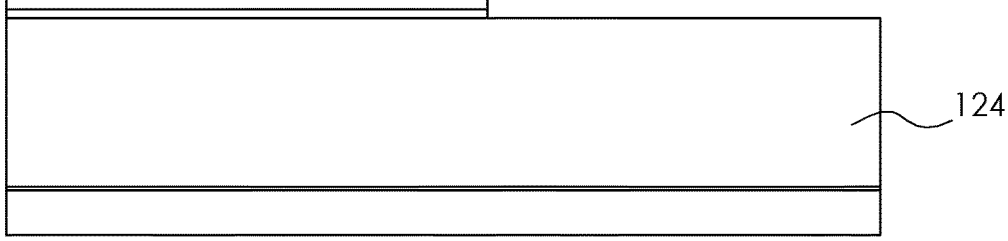
Figure 11:
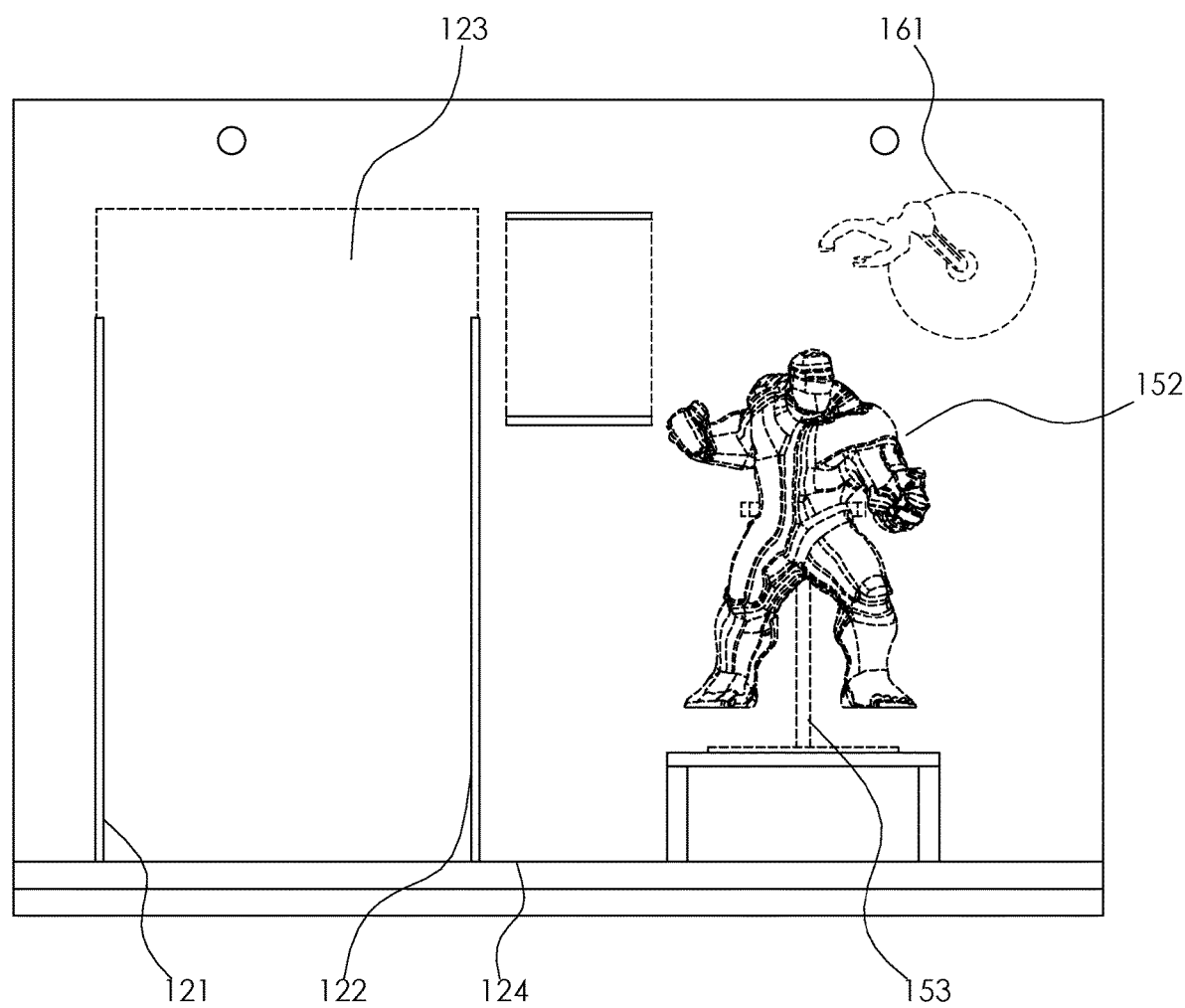
FIG. 11 is an in-use view of an embodiment of the disclosure.

Detailed reference will now be made to one or more potential embodiments of the disclosure, which are illustrated in FIGS. 1 through 11.

The magnetic shelf system 100 (hereinafter invention) is a display. The invention 100 is configured for use with one or more images 104. The invention 100 is configured for use with one or more figurines 105. There is a one to one correspondence 7 between the one or more images 104 and the one or more figurines 105. Each individual image 141 selected from the one or more images 104 is associated with an individual figurine 151 selected from the one or more figurines 105. The magnetic shelf display comprises a mounting shield 101, an image mount 102, and a figurine shelf 103. The image mount 102 and the figurine shelf 103 attach to the mounting shield 101. The image mount displays an individual image 141 selected from the one or more images 104. The figurine shelf 103 displays the individual figurine 151 selected from the one or more figurines 105 that is associated with the selected individual image 141.

The one or more images 104 comprises one or more individual images 141. Each individual image 141 selected from the one or more images 104 is an image. The image presents indicia used to identify a sentiment. The terms image, indicia, and sentiment are defined elsewhere in this disclosure. Each selected individual image 141 is displayed from a sheeting such as paper.

Each individual image 141 selected from the one or more images 104 is an image of one or more indicia. Each selected individual image 141 present one or more indicia that identify a sentiment. Any individual image 141 selected from the one or more images 104 removably attaches to the image plate 123 of the image mount 102 for display.

The one or more figurines 105 comprises one or more individual figurines 151. Each individual figurine 151 selected from the one or more figurines 105 is a figurine. Each selected individual figurine 151 is displayed with the individual image 141 selected from the one or more images 104 that is associated with the selected individual figurine 151. Each individual figurine 151 selected from the one or more figurines 105 is a three dimensional structure that identifies a sentiment. Each individual figurine 151 selected from the one or more figurines 105 removably attaches to the figurine base 131 of the figurine shelf 103. Each selected individual figurine 151 magnetically attaches to the figurine base 131 of the figurine shelf 103. Each individual figurine 151 further comprises a figurine structure 152 and a magnetic pedestal 153.

The figurine structure 152 is the physical three dimensional structure that identifies the sentiment associated with the individual figurine 151. The magnetic pedestal 153 forms a pedestal that transfers the load of the figurine structure 152 to the figurine base 131. The magnetic pedestal 153 removably attaches to the figurine base 131. The magnetic pedestal 153 magnetically attaches to the figurine base 131.

The magnetic pedestal 153 secures each selected individual figurine 151 to the figurine base 131.

The mounting shield 101 is a disk shaped structure. The mounting shield 101 is formed as a magnet. The image mount 102 magnetically attaches to the mounting shield 101. The figurine shelf 103 magnetically attaches to the mounting shield 101. The mounting shield 101 attaches to a vertical surface. The mounting shield 101 transfers the loads of the image mount 102 and the figurine shelf 103 to the vertical surface. The magnetic shield 101 further comprises a magnetic hero hanger 161.

The magnetic hero hanger 161 removably attaches to the mounting shield 101. The magnetic hero hanger 161 magnetically attaches to the mounting shield 101. The magnetic hero hanger 161 forms a clip that is sized to receive any individual figurine 151 selected from the one or more figurines 105. The selected individual figurine 151 clips directly on the magnetic hero hanger 161. The magnetic hero hanger 161 forms a load path that transfers the load of the selected individual figurine 151 to the mounting shield 101. The magnetic hero hanger 161 suspends the selected individual figurine 151 from the mounting shield 101 such that a span of distance exists between the selected individual figurine 151 and the mounting shield.

The image mount 102 is a mechanical structure. The image mount 102 is formed from a magnetic material. The image mount forms a display. The image mount 102 displays an individual image 141 selected from the one or more images 104. The selected individual image 141 attaches to the image mount 102. The image mount 102 elevates the selected individual image 141 above a supporting surface. The image mount 102 comprises a first vertical mount 121, a second vertical mount 122, an image plate 123, and an image base 124.

The first vertical mount 121 is a disk shaped structure. The first vertical mount 121 is formed from a magnetic material. The first vertical mount 121 is formed as a magnet. The first vertical mount 121 magnetically attaches to the image plate 123. The first vertical mount 121 removably secures the individual image 141 to the image plate 123. The first vertical mount 121 magnetically secures the individual image 141 to the image plate 123. The sheeting structure of the individual image 141 is positioned between the first vertical mount 121 and the image plate 123 when the first vertical mount 121 secures the individual image 141 to the image plate 123.

The second vertical mount 122 is a disk shaped structure. The second vertical mount 122 is formed from a magnetic material. The second vertical mount 122 is formed as a magnet. The second vertical mount 122 magnetically attaches to the image plate 123. The second vertical mount 122 removably secures the individual image 141 to the image plate 123. The second vertical mount 122 magnetically secures the individual image 141 to the image plate 123. The sheeting structure of the individual image 141 is positioned between the second vertical mount 122 and the image plate 123 when the second vertical mount 122 secures the individual image 141 to the image plate 123.

The image plate 123 is a disk shaped structure. The image plate 123 is formed from a magnetic material. The image plate 123 magnetically attaches to the mounting shield 101. The first vertical mount 121 magnetically attaches to the image plate 123. The second vertical mount 122 magnetically attaches to the image plate 123. The first vertical mount 121 removably attaches the individual image 141 selected from the one or more images 104 to the image plate 123. The second vertical mount 122 removably attaches the individual image 141 selected from the one or more images 104 to the image plate 123. The selected individual image 141 mounts on the image plate 123 such that the selected individual image 141 is visibly displayed.

The image base 124 is a shelf structure. The image base 124 attaches to the inferior edge of the image plate 123. The image base 124 has a roughly prism shaped structure. The image base 124 has a tubular shape. The image base 124 is formed from a magnetic material. The image base 124 attaches to the image plate 123 such that the image base 124 maintains a position that is inferior to the selected individual image 141 that is attached to the image plate 123. The image base 124 forms a horizontally oriented platform on which objects can be placed.

The figurine shelf 103 is a mechanical structure. The figurine shelf 103 is formed from a magnetic material. The figurine shelf 103 forms a display. The figurine shelf 103 displays an individual figurine 151 selected from the one or more figurines 105. The selected individual figurine 151 attaches to the figurine shelf 103. The figurine shelf 103 elevates the selected individual figurine 151 above a supporting surface. The individual figurine 151 selected from the one or more figurines 105 for display is the individual figurine 151 that is associated with the individual image 141 selected from the one or more images 104 that is displayed on the image mount 102. The figurine shelf 103 further comprises a figurine base 131.

The figurine base 131 is a u-shaped structure. The figurine base 131 is formed from a magnetic material. The figurine base 131 magnetically attaches to the mounting shield 101. The figurine base 131 forms a horizontally oriented platform. The figurine base 131 projects away from the face of the disk structure of the mounting shield 101 such that the figurine base 131 forms a ledge that projects away from the mounting shield 101. The figurine base 131 forms a shelf used to display the individual figurine 151 selected from the one or more figurines 105 that is associated with the displayed individual image 141. The selected individual figurine 151 magnetically attaches to the figurine base 131.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Cant: As used in this disclosure, a cant is an angular deviation from one or more reference lines (or planes) such as a vertical line (or plane) or a horizontal line (or plane).

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Display: As used in this disclosure, a display is a structure that is intended to visually present an object, image, or concept to an individual.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Figurine: As used in this disclosure, a figurine is a three dimensional structure resembling (or representing) a human, animal, natural, or symbolic sentiment.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Image: As used in this disclosure, an image is an optical representation or reproduction of an indicia or of the appearance of something or someone. See indicia sentiment optical character recognition.

Indicia: As used in this disclosure, the term indicia refers to a set of markings that identify a sentiment.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Ledge: As used in this disclosure, a ledge is a first plate structure that projects away from a second plate structure. A ledge that projects away from, or overhangs, the second plate structure in the manner of a cantilever is referred to as an undercut ledge.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field. A magnet is further defined with a north pole and a south pole. By aligning with an external magnetic field is meant that the north-south pole structure of a first magnet will align with the north south pole of a second magnet. The pole of any first magnet will attract the opposite pole of any second magnet (i.e. a north pole will attract a south pole).

Magnetic Material: As used in this disclosure, a magnetic material is a substance that attracts or is attracted to a magnet but that itself has no net magnetic moment (beyond any residual moment created by prior use). Common classes of magnetic materials include ferromagnetic, diamagnetic, paramagnetic, ferrimagnetic and antiferromagnetic.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set 14 and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Paper: As used in this disclosure, paper refers to a sheeting material commonly used as: a) a substrate on which people write; b) a substrate on which images are displayed; and, c) wrapping or covering items. Paper is typically made from plant fibers such as cellulose. Paper intended for specific purposes may be made from other materials.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Platform: As used in this disclosure, a platform is a raised horizontal surface that forms a load path to support objects placed on the superior surface of the platform.

Present: As used in this disclosure, to present means to bring an object, image, or concept to the attention of an individual.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Puppet: As used in this disclosure, a puppet is a three-dimensional figure resembling a human, animal or symbolic image that is used for decorative, entertainment, or educational purposes. A puppet is often called a doll.

Roughly: As used in this disclosure, roughly refers to a comparison between two objects. Roughly means that the difference between one or more parameters of the two compared objects are not significantly different.

Sentiment: As used in this disclosure, a sentiment refers to a symbolic meaning or message that is communicated through the use of an object or an image, potentially including a text based image.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Shelf: As used in this disclosure, a shelf is a horizontal surface that supports one or more objects at an elevated position.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Surface: As used in this disclosure, a surface refers to a solid boundary structure that is exposed to (or adjacent to) a negative space.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

U-Shaped Structure: As used in this disclosure, a U-shaped structure is a type of offset composite prism structure. The U-shaped structure is a three sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of length of the first arm roughly equals the span of length of the second arm. An illiterate U-shaped structure refers to a U-shaped structure wherein the span of the length of the first arm differs from the span of the length of the second arm by more than 10 percent. A guided U-shaped structure refers to a U-shaped structure that has: a) the first arc formed by the interior cant formed between the first arm and the crossbeam is greater than or equal to 100 degrees; b) a second arc formed by the interior cant formed between the second arm and the crossbeam is greater than or equal to 100 degrees; and, c) the first arc and the second arc are roughly equal.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wall: As used in this disclosure, a wall is a vertical surface of a room or chamber.

With respect to the above description, it is to be realized that the optimum dimensional relationship for the various components of the invention described above and in FIGS. 1 through 11 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A magnetic shelf system comprising
   wherein the magnetic shelf display comprises a mounting shield, an image mount, and a figurine shelf;
   wherein the image mount and the figurine shelf attach to the mounting shield;
   wherein the magnetic shelf system is configured for use with one or more images;
   wherein the magnetic shelf system is configured for use with one or more figurines;
   wherein there is a one to one correspondence between the one or more images and the one or more figurines;
   wherein the mounting shield is a disk shaped structure;
   wherein the mounting shield is formed as a magnet;
   wherein the image mount magnetically attaches to the mounting shield;
   wherein the figurine shelf magnetically attaches to the mounting shield;
   wherein the mounting shield attaches to a vertical surface;
   wherein the mounting shield transfers a loads of the image mount and the figurine shelf to the vertical surface.

2. The magnetic shelf system according to claim 1
   wherein the magnetic shelf system is a display;
   wherein each individual image selected from the one or more images is associated with an individual figurine selected from the one or more figurines.

3. The magnetic shelf system according to claim 2
   wherein the image mount displays an individual image selected from the one or more images;
   wherein the figurine shelf displays the individual figurine selected from the one or more figurines that is associated with the selected individual image.

4. The magnetic shelf system according to claim 3 wherein the one or more images comprises one or more individual images;
   wherein each individual image selected from the one or more images is an image;
   wherein the image presents indicia used to identify a sentiment;
   wherein any individual image selected from the one or more images removably attaches to the image plate of the image mount for display.

5. The magnetic shelf system according to claim 4
   wherein the one or more figurines comprises one or more individual figurines;
   wherein each individual figurine selected from the one or more figurines is a figurine;

wherein each selected individual figurine is displayed with the individual image selected from the one or more images that is associated with the selected individual figurine;

wherein each individual figurine selected from the one or more figurines removably attaches to the figurine base of the figurine shelf;

wherein each selected individual figurine magnetically attaches to the figurine base of the figurine shelf.

6. The magnetic shelf system according to claim 5
wherein each individual figurine further comprises a figurine structure and a magnetic pedestal;

wherein the figurine structure is the physical three dimensional structure that identifies the sentiment associated with the individual figurine;

wherein the magnetic pedestal forms a pedestal that transfers the load of the figurine structure to the figurine base;

wherein the magnetic pedestal removably attaches to the figurine base;

wherein the magnetic pedestal magnetically attaches to the figurine base.

7. The magnetic shelf system according to claim 6
wherein the image mount is a mechanical structure;
wherein the image mount is formed from a magnetic material;
wherein the image mount forms a display;
wherein the image mount displays an individual image selected from the one or more images;
wherein the selected individual image attaches to the image mount.

8. The magnetic shelf system according to claim 7
wherein the figurine shelf is a mechanical structure;
wherein the figurine shelf is formed from a magnetic material;
wherein the figurine shelf forms a display;
wherein the figurine shelf displays an individual figurine selected from the one or more figurines;
wherein the selected individual figurine attaches to the figurine shelf;
wherein the figurine shelf elevates the selected individual figurine above a supporting surface;
wherein the individual figurine selected from the one or more figurines for display is the individual figurine that is associated with the individual image selected from the one or more images that is displayed on the image mount.

9. The magnetic shelf system according to claim 8
wherein the image mount comprises a first vertical mount, a second vertical mount, an image plate, and an image base;
wherein the first vertical mount is a disk shaped structure;
wherein the first vertical mount is formed from a magnetic material;
wherein the first vertical mount is formed as a magnet;
wherein the first vertical mount magnetically attaches to the image plate;
wherein the second vertical mount is a disk shaped structure;
wherein the second vertical mount is formed from a magnetic material;
wherein the second vertical mount is formed as a magnet;
wherein the second vertical mount magnetically attaches to the image plate;
wherein the image plate is a disk shaped structure;
wherein the image plate is formed from a magnetic material;
wherein the image plate magnetically attaches to the mounting shield;
wherein the first vertical mount removably attaches the individual image selected from the one or more images to the image plate;
wherein the second vertical mount removably attaches the individual image selected from the one or more images to the image plate;
wherein the selected individual image mounts on the image plate such that the selected individual image is visibly displayed;
wherein the image base is a shelf structure;
wherein the image base attaches to the inferior edge of the image plate;
wherein the image base has a tubular shape;
wherein the image base is formed from a magnetic material;
wherein the image base attaches to the image plate such that the image base maintains a position that is inferior to the selected individual image that is attached to the image plate;
wherein the image base forms a horizontally oriented platform on which objects can be placed.

10. The magnetic shelf system according to claim 9
wherein the figurine shelf further comprises a figurine base;
wherein the figurine base is a u-shaped structure;
wherein the figurine base is formed from a magnetic material;
wherein the figurine base magnetically attaches to the mounting shield;
wherein the figurine base forms a horizontally oriented platform;
wherein the figurine base projects away from the face of the disk structure of the mounting shield such that the figurine base forms a ledge that projects away from the mounting shield;
wherein the figurine base forms a shelf used to display the individual figurine selected from the one or more figurines that is associated with the displayed individual image;
wherein the selected individual figurine magnetically attaches to the figurine base.

11. The magnetic shelf system according to claim 10
wherein the magnetic shield further comprises a magnetic hero hanger;
wherein the magnetic hero hanger removably attaches to the mounting shield;
wherein the magnetic hero hanger magnetically attaches to the mounting shield;
wherein the magnetic hero hanger forms a clip that is sized to receive any individual figurine selected from the one or more figurines;
wherein the selected individual figurine clips directly on the magnetic hero hanger.

\* \* \* \* \*